United States Patent

[11] 3,584,233

[72] Inventors Pieter G. Cath
Briarcliff Manor;
Robin Williams, Yorktown Heights, both of, N.Y.
[21] Appl. No. 777,685
[22] Filed Nov. 21, 1968
[45] Patented June 8, 1971
[73] Assignee U. S. Philips Corporation
New York, N.Y.

[54] LINEARITY CORRECTION CIRCUIT EMPLOYING FET AT INPUT OF DIFFERENTIAL OPERATIONAL AMPLIFIER
9 Claims, 7 Drawing Figs.

[52] U.S. Cl. .......... 307/230, 307/304, 330/30, 330/35, 330/19, 328/163
[51] Int. Cl. .......... G06g 7/12
[50] Field of Search .......... 330/3, 19, 24, 30 D, 30, 38 FE; 307/229, 304, 230; 328/163

[56] References Cited
UNITED STATES PATENTS

| | | | |
|---|---|---|---|
| 3,382,461 | 5/1968 | Wolcott | 330/38X |
| 3,451,006 | 6/1969 | Grangaard | 330/30X |
| 3,472,066 | 10/1969 | Cross | 330/3X |
| 3,493,881 | 2/1970 | Zuch | 330/38X |

*Primary Examiner*—John S. Heyman
*Attorney*—Frank R. Trifari

ABSTRACT: A gamma correction circuit, to compensate for nonlinear video display tube characteristics, is provided with a field effect transistor operating with the gate electrode thereof forward biased to generate a compensation characteristic, an operational amplifier for subtracting the compensation characteristic from the nonlinear tube characteristic, and a load for developing the compensated signal. In a specific embodiment, the compensation characteristic is generated, and the linear portion of the uncorrected signal subtracted therefrom, to develop a correctional curve with zero end-points. The gain of the curve is adjusted by varying the circuit gain, and the linear function reinserted to obtain the desired function.

Figure 1:
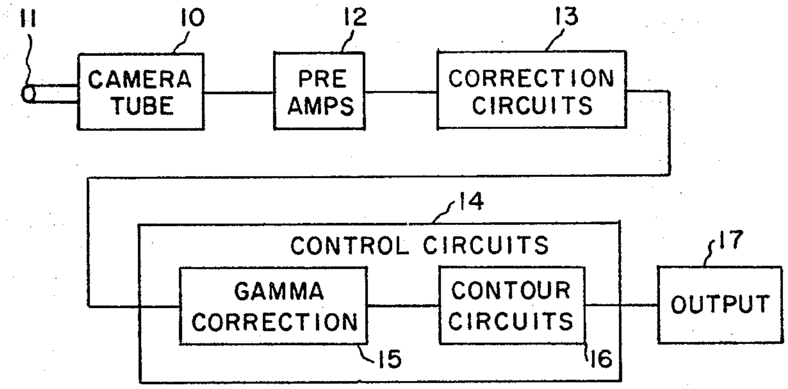

*INVENTORS*
PIETER G. CATH
ROBIN WILLIAMS
*BY* Frank R. Trifari
AGENT

*INVENTORS*
PIETER G. CATH
ROBIN WILLIAMS
BY
Frank R. Trifari
AGENT

INVENTORS
PIETER G. CATH
ROBIN WILLIAMS
BY
Frank R. Trifari
AGENT

INVENTORS.
PIETER G. CATH
ROBIN WILLIAMS
BY
Frank R. Trifari
AGENT

LINEARITY CORRECTION CIRCUIT EMPLOYING FET AT INPUT OF DIFFERENTIAL OPERATIONAL AMPLIFIER

This invention relates generally to video signal systems and particularly to circuital arrangements for correcting nonlinearity in video pickup and display systems.

The CRT (picture tube) in a television receiver has a light output that is not linear with the applied video signal. If no compensation were provided for this nonlinearity, the signal reproduction would not be correct and would deleteriously affect accurate reproduction of color, intensity and other video characteristics. For this reason the video signal is preprocessed by an amplifier that has a nonlinear amplitude characteristic. This processing, called gamma correction, can be done either in the receiver or at the transmitting end. In practice it is done in the television camera system itself.

For color television, the requirements for gamma-correction circuits have become more stringent. In particular, there is a need for a circuit that has the required nonlinearity and is also temperature stable.

The gamma transfer characteristic can be realized by using nonlinear circuits elements in various ways. However, the characteristics of these elements (diodes, transistors, etc.) are temperature dependent, and it is not possible to use the nonlinearity of these elements without also incurring their temperature dependence. The temperature effects can be compensated for by using more elements but achieving perfect compensation is not possible in simple circuits. Circuits using diode networks and having compensated nonlinearities were investigated but these were found to offer no significant improvements over circuits used in the past.

It is therefore a prime object of this invention to provide a gamma-correction circuit arrangement which will provide significant nonlinearity compensation.

It is a further object of the invention to provide a gamma-correction circuit arrangement which will maintain temperature compensation with the required degree of nonlinearity.

In the search for an improved gamma-correction circuit, the characteristics of the field effect transistor were studied.

As is well known, a field effect transistor (FET) has a biasing point such that its drain current ($I_d$) does not vary with temperature over a considerable range of drain-to-source voltage ($V_{ds}$). This occurs when the proper reverse bias is applied to the FET gate. However, for the nonlinearity of the FET output characteristic ($I_d$ versus $V_{ds}$) to be approximately the shape of the gamma curve, the drain-to-source voltage must be varied over a 10 volt range. This is too large a voltage swing for this application, since the existing voltage levels in the pickup systems at the correction stage is about 1 or 2 volts.

It has been discovered, however, that there is another part of the FET output characteristic that does exhibit the required nonlinearity, yet only requires a signal level of approximately 1 volt (maximum). If the gate of an FET is forward biased (i.e. positive for an *n*-channel FET, negative for a *p*-channel FET), then the resulting drain current ($I_d$) versus drain-to-source voltage ($V_{ds}$) characteristic for $0 \lesssim [V_{ds}] \leq 1$ volt has a shape that almost exactly corresponds to the gamma correction curve used in television systems. Moreover, it has been found that it is possible to obtain a temperature coefficient for this characteristic which approaches 0.

By forward biasing the gate of the FET the drain current will remain constant as the temperature is increased. This is because the decrease in the drain current caused by the reduced mobility of the majority carriers in the FET channel is compensated for by an increase in the conductivity of the channel caused by the injection of minority carriers from the forward biased gate. Although the actual value of the gate-to-source voltage ($V_{gs}$) varies slightly from FET to FET, depending upon the gate and channel doping levels, the effect is the same.

An even closer approximation to the gamma curve can be obtained by biasing the gate at just below 1 volt. But with $V_{gs}$ equal to this bias level the drain current will increase as the temperature is increased. By deliberately introducing a resistance in the gate supply voltage, a negative feedback effect is created to overcome this effect. The gate to source voltage will decrease with increasing temperature because of the increasing gate current, and will cause the drain current to decrease. These effects can also be made to balance out over the small range of $V_{ds}$ to be used.

It is desirable to vary the gain characteristic of the correction circuit. However, the end points of the correction curve must remain at fixed values to insure proper compensation. To accomplish this, a desired characteristic curve is obtained from an FET preferably operating in a forward biased mode. A signal of assumed linearity is subtracted from the characteristic curve as by a differential input operational amplifier, and the resulting function will have zero end points. Variation of the gain characteristic will vary the shape of the resulting function, however, its end points will remain at 0. Then the linear function is reinserted and the resulting function represents the desired gamma correction curve.

Figure 2:
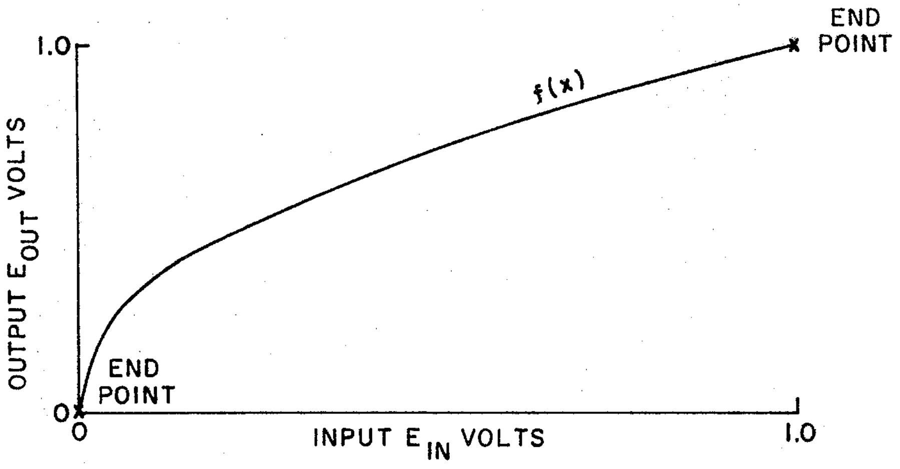
Figure 3:
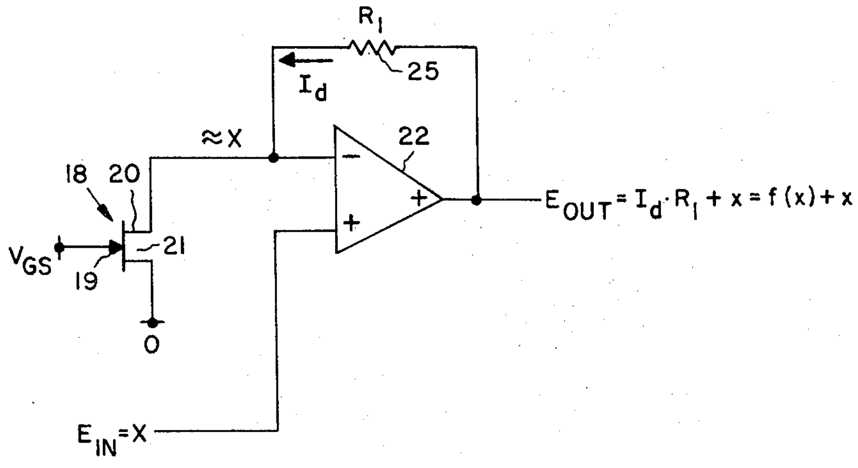
Figure 4:
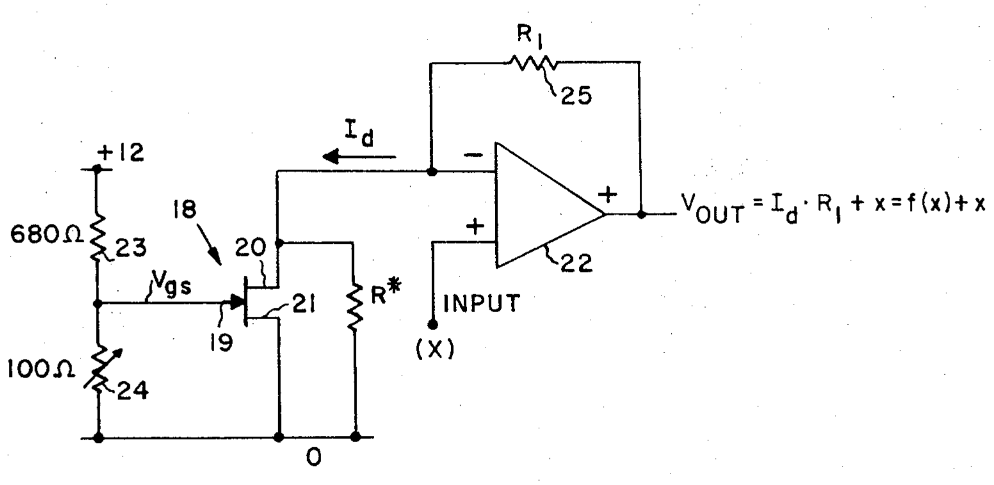
Figure 5:
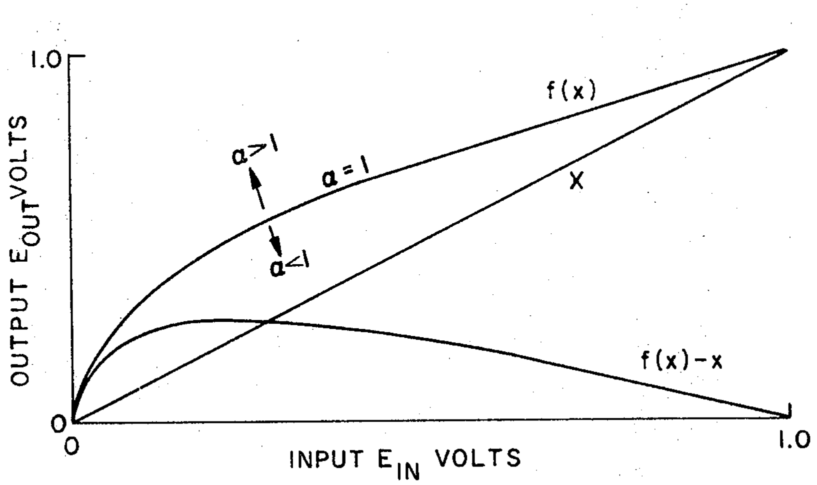
Figure 7:
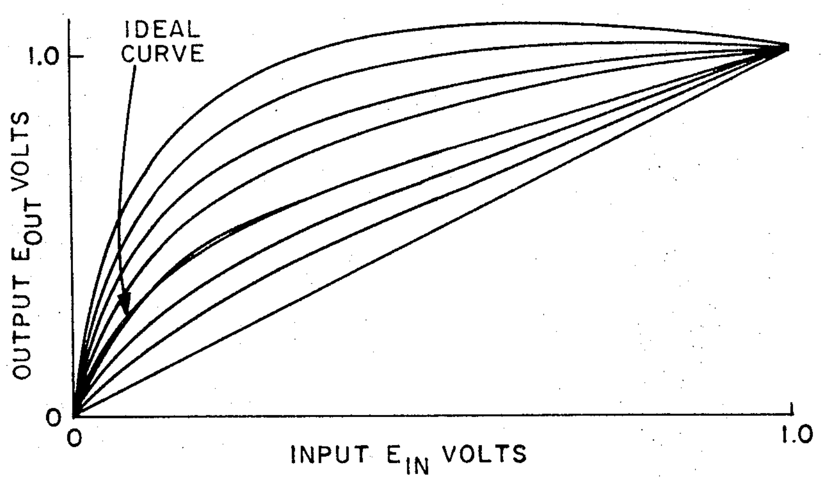
Figure 6:
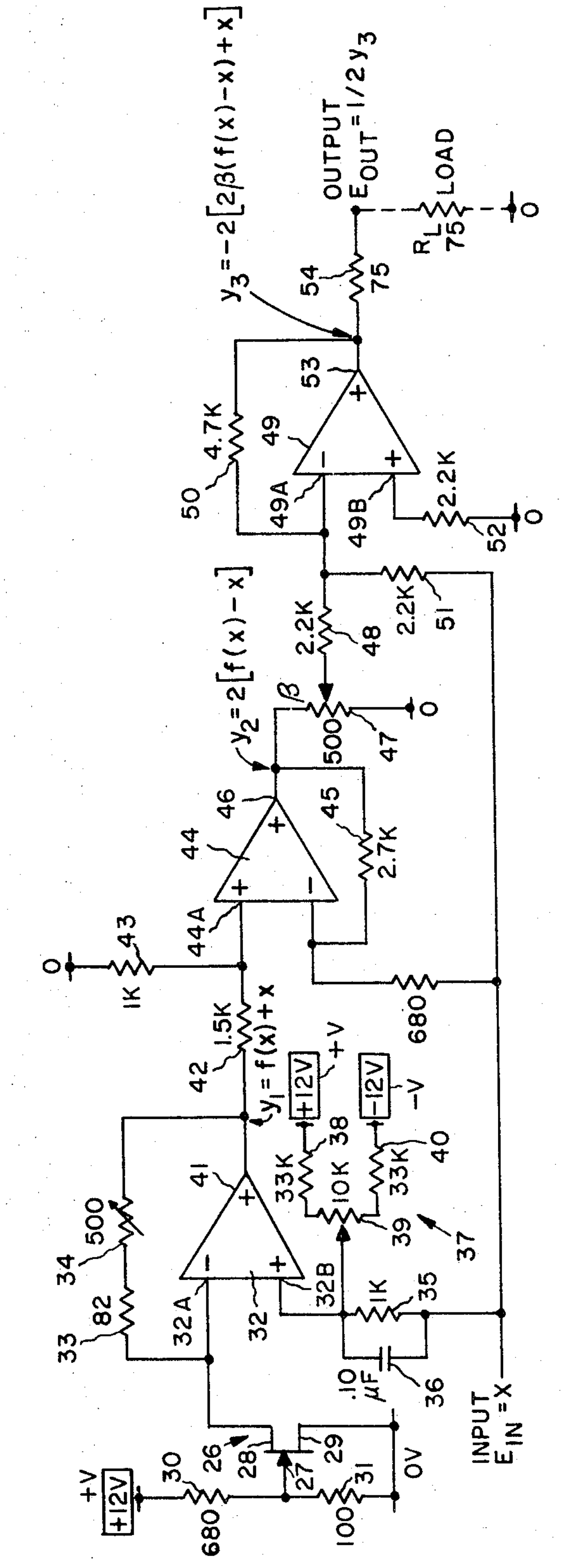

The foregoing objects and brief description will become apparent from the following description and appended drawings, wherein FIG. 1 is a block diagram of a TV pickup system; FIG. 2 is a gamma correction characteristic curve, FIG. 3 is the basic arrangement embodying the invention, FIG. 4 is a modification of FIG. 3, FIG. 5 is a graphical illustration of the relationship of the wave forms of the invention, FIG. 6 is more detailed arrangement of the circuit embodying the invention and FIG. 7 is an illustration of resulting waveforms.

Referring to FIG. 1, a TV pickup system will customarily employ a camera tube 10, having a lens 11, for suitably converting an image into electrical output which is in turn led into a series of preamplifiers 12 and then to a correction unit 13. The correction circuit includes the conventional correction circuitry and in known manner provides frequency compensation, black level correction, clamping, addition of horizontal and vertical blanking pulses and the like. The corrected video signal is then transmitted to a control circuit unit 14 which contains the gamma correction circuit 15 and the various contour circuits 16 such as aperture correction and the like. The arrangement finally presents an acceptable video signal to a suitable output 17.

As noted above, the CRT possesses an inherent nonlinearity. Simply stated this means that the quantum of incident light developed in accordance with a signal does not vary proportionally with the variation in the signal but rather varies in accordance with a nonlinear function, or gamma.

The gamma correction circuit should have a transfer characteristic of:

$$E_{out} = \gamma (E_{in})^{\gamma}$$

where, $E$ = output voltage $E_{in}$ = input voltage

The factor $\gamma$ may vary slightly from tube to tube, but in practice it is assigned a nominal value of 1/2.2.

To compensate for pickup tube differences, the transfer characteristic should be adjustable with a single potentiometer control to give gamma variations of ±10 percent, and the end points of the transfer curve should remain fixed as the gamma control is varied.

FIG. 2 shows the relationship between input and output voltage in accordance with the transfer characteristic of the gamma correction circuit. The two end points are noted, and these should always remain fixed regardless of the variation which may occur within the gamma correction unit.

Referring to FIG. 3, a circuit arrangement for providing the required signal includes an FET 18 having a gate electrode 19, a drain electrode 20 and a source electrode 21. The FET employed, by way of example, is a 2N3823. The drain of the FET is connected to the inverting input of a conventional high gain operational amplifier 22 with differential inputs. The noninverting input terminal of the amplifier is supplied with the uncorrected video signal ($x$). A potential $V_{gs}$ forward biases the FET to the region of its desired characteristic.

An even closer approximation to the gamma curve can be obtained by biasing the gate at just below 1 volt. But with $V_{gs}$ equal to this bias level the drain current will increase as the temperature is increased. By deliberately introducing a resistance in the gate supply voltage, a negative feedback effect is created to overcome this effect. The gate to source voltage will decrease with increasing temperature because of the increasing gate current, and will cause the drain current to decrease. These effects can also be made to balance out over the small range of $V_{ds}$ to be used.

As shown in FIG. 4, the resistances 23 and 24 serve to properly bias the FET 18 and add the resistance in the gate supply voltage while resistance 25 ($R_1$) provides a proper feedback for the amplifier. The divider 23—24 presents the correct impedance (approximately 100Ω for the exemplary values illustrated) in the gate circuit to obtain ideal temperature compensation.

The circuit shown in FIGS. 3 and 4 generates $V_{out}=f(x)++x$, where $f(x)$ is the $I_d$ versus $V_{ds}$ characteristic of the FET and the input $x=V_{ds}$. For an *n*-channel FET, $V_{gs}$ is set to the positive potential (about 0.9 volt) where the $I_d$, $V_{ds}$ characteristic is automatically temperature compensated. The input voltage ($x$) is applied to the operational amplifier noninverting input and the output voltage is then obtained by adding the two voltage drops $x$ and $I_d R_1$ giving $E_{out}=I_d R_1+$(assuming the operational amplifier is ideal), and $I_d R_1=f(x)$. Therefore, $E_{out}$ can be scaled by choosing an appropriate $R_1$ value ($R_1$ is chosen so that when $V_{ds}=x=1$ volt, $f(x)=1$ volt, and therefore, $E_{out}=2$ volts).

Referring to FIG. 1 or 5, the ideal gamma-correction transfer characteristic is almost exactly equal to $f(x)$. An even closer approximation may be obtained by introducing a resistor $R^*$ (FIG. 4), across the FET and trimming its value and that of $V_{gs}$ to get the best match of the $I_d$, $V_{ds}$ characteristic to the gamma curve. In this case, $I$ is the total current in the FET drain and the resistor $R^*$. However, in practice, a method for adjusting the entire gamma curve is required to match the characteristics of the preceding equipment (for example, the pickup tube in television cameras). It should also be noted that when the gamma correction circuit is adjusted, the two end points of the transfer curve should remain fixed.

The essence of the approach is to subtract the linearity of the function ($x$) from the gamma curve $f(x)$ to form $[f(x)-x]$. The function is multiplied by $x$ $\alpha$, the gain of the correction circuit. Then ($x$) is added back to the function $\alpha$ $[f(x)-x]$. Thus one obtains $\alpha$ $[f(x)-x]+x$. The end points of this curve are independent of $\alpha$ because when $x=0$ and when $x=1$, $[f(x)-]$ is zero. When $\alpha=1$, $\alpha$ $(f(x)-x)+x=f(x)$ which is the gamma curve function, and adjusting $\alpha$ to be different from 1 effectively varies the gamma of the transfer characteristic whereas the end points of the gamma curve remain fixed. A circuit implementing the foregoing relationship is shown in FIG. 6.

The arrangement of FIG. 6 shows an *n*-channel FET 26 having a gate electrode 27, a drain electrode 28 and a source electrode 29. A pair of resistors 30 and 31 connected between a source of voltage $+V$ and a reference point such as ground provide a forward biasing voltage on the gate electrode 27 and introduces a temperature compensation onto the gate electrode. The output or drain electrode 28 is coupled to the inverting input 32A of a differential input high gain operational amplifier 32 which is provided with a negative feedback path including a fixed resistance 33 and a variable resistance 34. The uncorrected video input signal is connected to the noninverting input 32B terminal of the amplifier 32 through an RC network consisting of a resistance 35 connected in parallel with a capacitor 36. The input terminal 32B is also connected to a level adjusting potential divider network 37 which includes a first fixed resistor 38 connected in series with a variable resistor 39 and a second fixed resistor 40, all between a source of positive and negative potential designated as +V and −V. The level adjusting network 37 is not essential to the operation of the circuit and would be eliminated. The output appearing at the output terminal 41 of the amplifier 32 is fed through a biasing network of resistors 42 and 43 to the noninverting input 44A of a second differential input operational amplifier 44. The amplifier 44 includes a feedback resistor 45 and receives the video signal input at the inverting input terminal 42B. The signal from the output terminal 46 of the amplifier 44 is conveyed through a potentiometer 47 through a resistance 48 to the inverting input 49A of a third differential input operational amplifier 49 having a negative feedback resistor 50. The video input signal is also connected, through a resistance 51, to the inverting input 49A of the amplifier 49, and the noninverting input terminal 49B of amplifier 49 is connected to a reference or ground potential through a resistor 52.

The signal appearing at the output terminal 53 of the amplifier 49 is conducted through an output resistor 54 to a load $R_L$.

The values shown in the FIGURE are exemplary only and not intended to be limiting.

In the first stage of this circuit $Y_1=f(x)+x$ is formed as just described above. This signal and $x$ is then fed into the second operational amplifier 44 to generate $Y_2=2$ $[f(x)-x]$ in the second stage. Now, $Y_3=-2[2\beta f(x)-x)+x]=-2[\alpha(f(x)-x)+x]$ is formed with the third operational amplifier 49. The loaded output voltage $E_{out}=\frac{1}{2}Y_3$. The overall gamma-control potentiometer is 47 and the voltage at the wiper of potentiometer 47 will equal $\beta$ times the voltage $Y_2$, where $\beta$ can be adjusted between 0 $\beta$ 1. The variable $\beta$ is equal to $\beta=\alpha/2$ so that varying $\beta$ between 0 and 1 varies $\alpha$ between 0 and 2. Thus, adjusting potentiometer 47 sets the value of $\alpha$. The range of gamma-control is extremely wide; when $\alpha=0$, the output is $X$ and is therefore linear. As $\alpha$ is increased, the output curve becomes increasingly nonlinear passing through the approximate gamma curve $f(x)$ when $\alpha=1$. A plot shown, the relationships between transfer characteristics for various values of $\alpha$ for the circuit of FIG. 6 is shown in FIG. 7.

The output level is adjusted to zero volts at the beginning of the sweep (when the input $x=0$) by means of potentiometer 39 (amplifier offset compensation).

The output level across the load $R_L$ can be adjusted to be 1 volt at the end of the sweep (when $x=1$ volt), by means of potentiometer 34. Variation of potentiometer 37 varies the effective $\alpha$ of the arrangement producing the varying compensation curves shown in FIGS. 5 and 7.

When set up as above, adjusting potentiometer 47 will vary the $\alpha$ of the curve and the end points remain fixed. If the gamma curve is not a good enough approximation for some setting of potentiometer 47 near the middle of its range then the DC biasing voltage of the gate of the FET can be altered to accommodation. To this end the resistor 31 could also be made adjustable.

While the invention has been described and shown with reference to certain preferred embodiments thereof, it will be understood by those skilled in the art that other changes in form and details may be made therein without departing from the spirit and scope of the invention.

We claim:

1. A linearity-correction circuit comprising a field-effect transistor having gate, source and drain electrodes, means for providing a potential forward biasing the gate electrode of said field effect transistor to a desired range approximating the desired correction characteristic, said range providing a zero temperature coefficient characteristic, means coupling the drain source path of said field-effect transistor between one input of a differential input operational amplifier and a reference point, means connecting the uncorrected nonlinear signal to the other input of said amplifier, and means for deriving a linearity-corrected signal from the output of said amplifier.

2. The combination of claim 1 further including a resistance connected across the source drain path of said field effect transistor.

3. The combination of claim 1 further comprising a resistance in the gate electrode of said field effect transistor.

4. A linearity correction circuit comprising a field-effect transistor having gate, source and drain electrodes, means for providing a potential of constant value for forward biasing the gate electrode of said field effect transistor between the inverting input of a differential input operational amplifier and a reference point, means connecting the uncorrected nonlinear signal to the noninverting input of said amplifier and means for deriving a linearity-corrected signal from the output of said amplifier.

5. The combination of claim 4 further including a resistance connected across the source drain path of said field effect transistor.

6. The combination of claim 4 further comprising a resistance in the gate electrode of said field effect transistor.

7. A linearity correction circuit comprising a field effect transistor having gate, source and drain electrodes, means forward biasing the gate electrode of said field effect transistor, means coupling the drain source path of said field effect transistor to the inverting input of a first differential input operational amplifier, means coupling an uncorrected nonlinear signal to the noninverting input of said first operational amplifier, means coupling the output of said first operational amplifier to the noninverting input of a second differential input operational amplifier, means coupling said uncorrected nonlinear signal to the inverting input of said second amplifier, adjustable means connecting the output of said second amplifier to the noninverting input of a third differential input operational amplifier, means connecting a source of reference potential to the inverting input of said third amplifier, and output means connected to the output of said third amplifier for providing a linearly corrected signal.

8. The combination of claim 7 further comprising a resistive voltage divider network connected to the gate electrode of said field effect transistor for placing a forward bias thereon, said resistive voltage divider network further introducing a bias and a resistance to the gate electrode of a magnitude sufficient to allow said transistor to operate in a substantially zero temperature coefficient portion of its characteristic.

9. The combination of claim 8 further including means connected between said second and third operational amplifiers for varying the gain of said circuit.

PO-1050
(5/69)

UNITED STATES PATENT OFFICE
CERTIFICATE OF CORRECTION

Patent No. 3,584,233 Dated June 8, 1972

Inventor(s) Peiter G. Cath et al

It is certified that error appears in the above-identified patent and that said Letters Patent are hereby corrected as shown below:

Col. 1, line 18, "For" should start a new paragraph;

Col. 3, line 18, "++x" should be --+x--;

line 25, before "(assuming" "$R_1$+" should be --$R_1$+x--;

line 35, "Iis" should be --Id is--;

line 49, "(x)-]" should be --(x)-x]--;

Col. 4, line 27, "0 β 1" should be --0≥β≥1--;

Signed and sealed this 22nd day of August 1972.

(SEAL)
Attest:

EDWARD M.FLETCHER,JR.
Attesting Officer

ROBERT GOTTSCHALK
Commissioner of Patents